United States Patent [19]
McCollum

[11] Patent Number: 5,061,188
[45] Date of Patent: Oct. 29, 1991

[54] PNEUMOTHORAX DIAGNOSTIC AND TREATMENT MANIKIN

[76] Inventor: Linda L. McCollum, 1351 Sheffield Glen Way, Atlanta, Ga. 30329

[21] Appl. No.: 612,962

[22] Filed: Nov. 15, 1990

[51] Int. Cl.⁵ ............................................. G09B 23/34
[52] U.S. Cl. .................................. 434/267; 446/369; 446/370; 434/272; 434/265
[58] Field of Search .............. 434/262, 265, 267, 396, 434/268, 272, 274; 446/219, 226, 268, 269, 370; 273/DIG. 24

[56] References Cited

U.S. PATENT DOCUMENTS

| | | | |
|---|---|---|---|
| 1,634,189 | 6/1927 | Henry | 446/226 |
| 2,678,505 | 7/1951 | Munson | 434/272 |
| 2,748,256 | 5/1956 | Moran | 446/226 X |
| 3,068,590 | 12/1962 | Padellford | 434/265 |
| 3,374,554 | 3/1968 | De Bella | 434/272 |
| 3,872,609 | 3/1975 | Smrcka | 434/265 |
| 4,288,222 | 9/1981 | Kling | 434/272 |
| 4,331,426 | 5/1982 | Sweeney | 434/265 |
| 4,884,990 | 12/1989 | Lovik | 446/219 X |

FOREIGN PATENT DOCUMENTS

| | | | |
|---|---|---|---|
| 3049508 | 7/1982 | Fed. Rep. of Germany | 434/272 |
| 0563686 | 6/1977 | U.S.S.R. | 434/265 |

Primary Examiner—Richard J. Apley
Assistant Examiner—L. Thomas
Attorney, Agent, or Firm—James B. Middleton

[57] ABSTRACT

A manikin can be used to demonstrate the diagnosis and treatment of pneumothorax. A doll in the form of an infant has a ribcage placed in the thoracic cavity, and a balloon is received on one side and a dark filler is on the other. The balloon side will transilluminate as in an infant with pneumothorax to demonstrate the diagnosis; and, needle thoracentesis can be performed to deflate the balloon and to demonstrate the treatment. The ribcage provides realism in requiring accuracy in insertion of the needle between the ribs.

12 Claims, 1 Drawing Sheet

PNEUMOTHORAX DIAGNOSTIC AND TREATMENT MANIKIN

INFORMATION DISCLOSURE STATEMENT

Pneumothorax is a complication of neonatal respiratory disease. This condition requires immediate diagnosis and treatment to prevent the death of the infant. Both diagnosis and treatment are well known to those skilled in the art, but there remains a problem in teaching novices appropriate skills in the diagnosis and treatment. While pneumothorax is not unheard of, it is not so common that all trainees can have sufficient experience to feel comfortable in accurate diagnosis and treatment.

The primary prior art teaching method is through the use of live, anesthetized animals. While use of these animals is effective in demonstrating the clinical signs of pneumothorax as well as the treatment of pneumothorax, such demonstrations are traumatic to the animal, and expensive because the animals cannot be repeatedly used in such demonstrations due to the trauma to the animals. The prior art alternative is to utilize a moribund neonate, but of course this is available only occasionally, and it is not necessarily available when particular classes are to be taught.

The prior art includes manikins for use in medical demonstrations. By way of example, U.S. Pat. No. 3,665,087 discloses a manikin that produces appropriate audio signals as a trainee listens with a stethoscope. U.S. Pat. No. 3,947,974 discloses a similar system that also has appropriate outputs to indicate blood pressure. U.S. Pat. No. 4,907,973 discloses a model with which one can practice insertion of a catheter, the model causing realistic displays of physiological data. U.S. Pat. No. 4,915,635 discloses a manikin having an elaborate system for simulating various physiological signs. Nothing in the prior art is usable to demonstrate either the diagnosis or the treatment of pneumothorax.

SUMMARY OF THE INVENTION

This invention relates generally to manikins for medical demonstrations, and is more particularly concerned with a reusable manikin for demonstration of the diagnosis and treatment of pneumothorax.

The present invention provides a manikin simulating an infant. The manikin includes balloon means in one side of the thoracic cavity and light absorbing filler means in the other side of the thoracic cavity. The arrangement is such that, when the side of the cavity having the balloon means is illuminated with a light as is known for the diagnosis of pneumothorax, the entire area transilluminates widely. This transillumination is the known indication that the infant is suffering with pneumothorax. When the light is similarly used to illuminate the side of the thoracic cavity having the filler, there is only a small area of the body of the manikin that is lighted.

To allow practice in treatment of pneumothorax, the manikin includes a generally realistic ribcage in the anterior portion of the thoracic cavity of the manikin so the student is required to place a needle between the ribs of the infant. Thus, needle centesis can be carried out by inserting the needle between the ribs of the ribcage and into the balloon means. As a result, the diagnosis of the condition using the manikin of the present invention is very similar to the diagnosis of pneumothorax in a live infant, and treatment by needle thoracentesis is very similar to the actual treatment of a live infant.

The manikin is reusable, and is preferably arranged to allow the balloon means to be placed in either or both sides of the thoracic cavity.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENT

Figure 1:
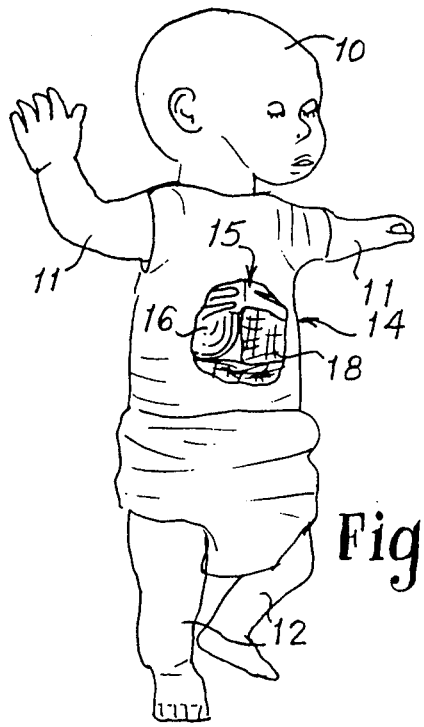
FIG. 1 is a generally front elevational view showing a manikin made in accordance with the present invention, portions thereof being broken away to disclose the inner construction.

Referring now more particularly to the drawings, and to that embodiment of the invention here chosen by way of illustration, FIG. 1 shows a manikin in the form of an infant, the manikin including substantially rigid head 10, arms 11 and legs 12. The body 14 is soft, generally having a fabric covering stuffed with a fibrous material, flexible foam or the like. While the entire manikin can be custom designed for the manikin of the present invention, there are dolls readily available that can be appropriately modified to create the manikin of the present invention. The commercially available dolls have the head and limbs that are generally rigid, and a soft body 14 that is usually stuffed with a soft, fibrous material.

The manikin of the present invention must include a ribcage generally designated at 15, the ribcage defining a thoracic cavity for selectively receiving a balloon means 16 and/or a light absorbing filler 18.

Figure 2:
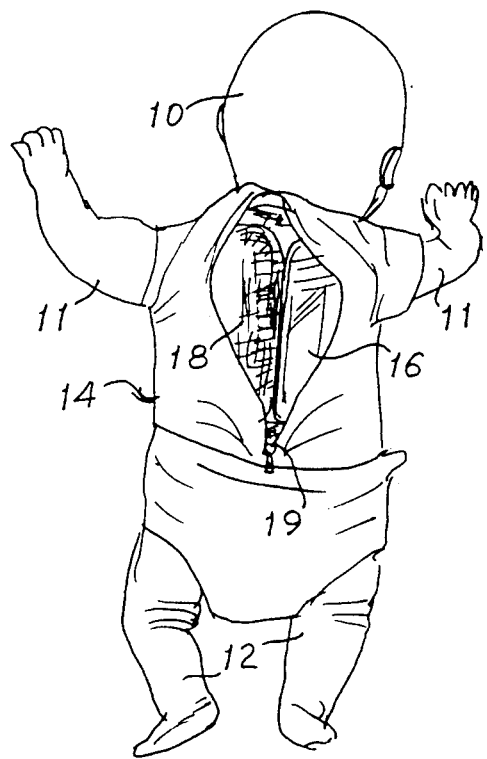
FIG. 2 is a rear elevational view of the device shown in FIG. 1, and showing the opening in the back of the manikin.

With attention to FIG. 2 of the drawings, some commercially available dolls are provided with a zipper 19 at the rear of the doll, extending along the area that would be the backbone of an infant. This zipper 19 provides access to the thoracic cavity and, if the zipper 19 is not already in place, a reclosable opening must be provided. It will be obvious to those skilled in the art that the zipper 19 might be utilized, or hook and teasel closure means might be utilized, or other well known closures.

Figure 3:
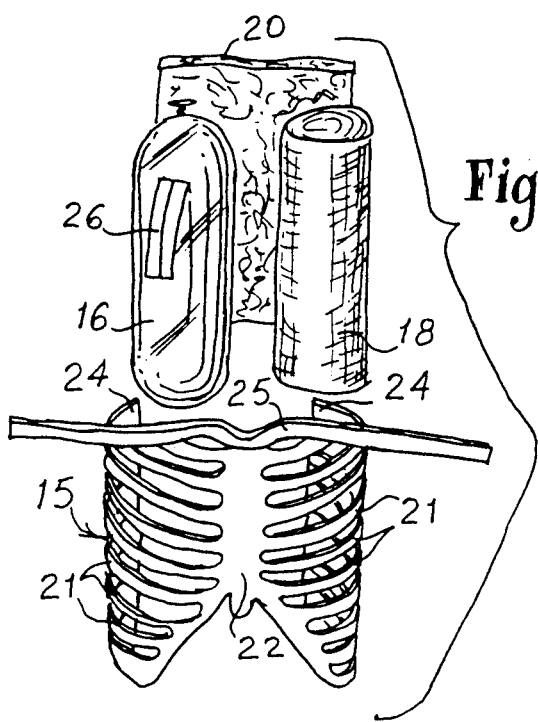
FIG. 3 is an exploded perspective view showing the ribcage and contents of the thoracic area; and, FIG. 4 is a cross-sectional view taken through the thoracic cavity of the manikin shown in FIGS. 1 and 2.

As is shown in FIG. 2 of the drawings, the ribcage 15 is not complete in the posterior portion. As will be discussed in more detail hereinafter, the anterior portion of the ribcage 15 as is illustrated in FIG. 1 of the drawings should be substantially anatomically accurate, but the posterior portion of the ribcage is preferably omitted to allow easy insertion and removal of the balloon means and the filler 16 and 18 respectively. FIG. 3 of the drawings shows the ribcage 15 with the balloon means and filler exploded therefrom, and a posterior padding means 20. In FIG. 3 it will be seen that the anterior portion of the ribcage 15 is substantially anatomically correct, the individual ribs 21 extending from the sternum 22 laterally across the front and curving around the sides. The rear ends of the ribs 21 then terminate at a vertical support member 24.

At the uppermost end of the ribcage 15, there is a transverse member 25 that is fixed to the sternum 22, and extends laterally therefrom in both directions. It will therefore be realized that the member 25 is generally equivalent to the clavicles in a live infant and will tend to give some shape to the shoulders of the soft bodied manikin. Also, the transverse member 25 can extend somewhat into the arms 11 to assist in holding the ribcage 15 in its appropriate position in the body 14.

For the side of the manikin that is to simulate the pneumothorax condition, a balloon means 16 is placed within the ribcage 15. As here illustrated, the balloon means 16 comprises a conventional toy balloon appropriately inflated to the desired size, and tied to retain the air. Those skilled in the art will realize that, when such a balloon is punctured by a needle, the balloon tends to explode into fragments, and this action would not imitate the action of an infant receiving needle thoracentesis. Thus, the balloon means 16 is provided with strips of tape 26 as means to prevent rapid explosion of the balloon 16. The tape 26 may be conventional transparent tape formed of vinyl or the like, and having an adhesive to adhere the tape to the balloon 16. Obviously, numerous other means can be used to prevent explosion of the balloon 16. For example, the balloon 16 may be formed of butyl rubber, vinyl or other elastomeric materials that allow the puncturing without explosion.

As shown in FIG. 3, the opposite side of the ribcage 15 is provided with a light absorbing filler 18. As here illustrated, the light absorbing filler 18 comprises a roll of fabric sized to fit the cavity in the ribcage 15. It is desirable that the filler 18 be colored black or other dark color in order to be substantially light absorbing. Obviously, the surface of the filler 18 needs to be dark colored to absorb light, but the interior portion of the filler 18 may be fabric, or may comprise a fibrous or foam filling material as long as the volume is sufficient to fill the ribcage 15.

Figure 4:
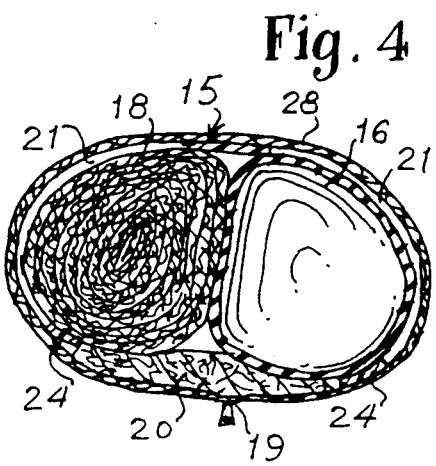

FIG. 4 of the drawings shows a cross-sectional view through the thoracic portion of the manikin illustrated in FIGS. 1 and 2 of the drawings. Here it will be seen that the balloon means 16 substantially fills one side of the thoracic cavity and the filler means 18 substantially fills the other side of the thoracic cavity. The anterior portion of the body 14 includes the covering 28 which is here shown as simply a layer of woven fabric. For greater realism it will be obvious that a layer of additional padding can be used between the ribcage 15 and the covering 28 to simulate additional body tissue.

Below the covering 28, there is the ribcage 15 having the ribs 21 extending in each direction from the sternum 22, the ribs 21 terminating in the vertical strips 24. Thus, the zipper 19 or other closure means can be selectively opened to allow removal of the padding 20, and subsequent removal of the balloon means 16 and filling means 18. With this arrangement, one can place the balloon means 16 in either side of the thoracic cavity, and the filling means 18 in either side of the thoracic cavity. Furthermore, one might occasionally use two balloon means 16, one in each side of the thoracic cavity to indicate a pneumothorax condition on both sides of the infant, or filler means 18 on both sides of the thoracic cavity to indicate an infant with no pneumothorax condition. It will therefore be understood that the manikin of the present invention can be utilized for instruction, and each student can have a different diagnostic test with the same manikin.

In a live infant, there is a visceral layer of pleura that covers the lungs, and there is a parietal layer of pleura that lines the inside of the chest. Each side of the body has these two pleurae, the pleurae forming discrete sacs on each side of the body. In the pneumothorax condition, gas fills the space between the two pleurae, or in the cavity of the pleura. The treatment for this condition is to extend a hypodermic needle into the cavity of the pleura to evacuate the gas from the cavity.

In diagnosing the pneumothorax condition, one shines a light against the thoracic portion of the infant and observes the illumination. If only a small part of the body of the infant is illuminated, it is an indication that the pneumothorax condition is not present; however, if this same light transilluminates virtually the entire side of the infant, it is an indication that the infant has the pneumothorax condition.

The model of the present invention allows an accurate demonstration of both the diagnosis and the treatment of the pneumothorax condition. When the side of the manikin having the balloon means 16 is illuminated, there is transillumination of the side of the manikin that is extremely similar to the transillumination of an infant having the pneumothorax condition. Similarly, if the side of the manikin having the filling material 18 is illuminated, there will be only a small spot on the body of the manikin illuminated, just as with a normal infant not having the pneumothorax condition.

Once a student has diagnosed the pneumothorax condition, which is to say the student has determined the side of the manikin having the balloon means 16 therein, needle thoracentesis can be carried out in substantially the same manner as with an infant suffering from pneumothorax. A needle will be inserted through the outer covering 28, between the ribs 21 and into the balloon means 16. The tape 26 is appropriately placed so that proper needle thoracentesis will engage the strips of tape 26, and the needle will simply enter the interior of the balloon means 16 and allow the air to be withdrawn therefrom.

Those skilled in the art will realize that one typically withdraws air from the infant through a bottle of water, and with appropriate valving and the like for the desired control. This equipment set up is well known to those skilled in the art and forms no part of the present invention. The invention should therefore be well understood without illustration of that equipment.

It will therefore be understood that the present invention provides a manikin for realistic demonstration of both diagnosis and treatment of the pneumothorax condition in neonates, the manikin being variable as to condition and reusable for an extended period of time with very inexpensive replacement parts.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A manikin for teaching diagnosis and treatment of pneumothorax, said manikin being in the general form of an infant and including a body, a flexible body covering, said body defining a thoracic cavity, balloon means selectively receivable within said thoracic cavity, said balloon means being such that said balloon means is transilluminated when light is directed against said body of said manikin adjacent to said balloon means, said thoracic cavity having a right side and a left side, said balloon means being selectively receivable in said right side and said left side, and further including a light absorbing filler selectively receivable in said right side and said left side.

2. A manikin as claimed in claim 1, and further including a ribcage located in the anterior portion of said thoracic cavity, said ribcage defining a posterior opening for selective receipt of said balloon means and said filler.

3. A manikin as claimed in claim 1, wherein said balloon means is received in one side of said thoracic cavity and said filler is received in the opposite side of said thoracic cavity, the arrangement being such that said one side can be transilluminated and said opposite side will absorb light and not be transilluminated.

4. A manikin as claimed in claim 2, and further including means for preventing explosion of said balloon means when needle centesis is performed on said manikin for deflating said balloon means.

5. A manikin as claimed in claim 4, said balloon means comprising a balloon of latex rubber, said means for preventing explosion of said balloon means including tape adhered to the surface of said balloon.

6. A manikin as claimed in claim 4, said flexible body covering defining an opening therein, and means for selectively closing said opening, the arrangement being such that said balloon means and said filler can be placed into said thoracic cavity and said opening can be closed to retain said balloon means and said filler.

7. A manikin for teaching the treatment of pneumothorax, said manikin being in the general form of an infant and including a body, a flexible body covering, said body defining a thoracic cavity, balloon means selectively receivable within said thoracic cavity, said balloon means being selectively receivable in said right side and left side, and further including a filler selectively receivable in said right side and said left side, the arrangement being such that said balloon means is in the place of one lung and said filler is in the place of the other lung.

8. A manikin as claimed in claim 7, and further including a ribcage located in the anterior portion of said thoracic cavity.

9. A manikin as claimed in claim 8, and further including means for preventing explosion of said balloon means when needle centesis is performed on said manikin for deflating said balloon means.

10. A manikin as claimed in claim 9, said balloon means comprising a balloon of latex rubber, said means for preventing explosion of said balloon means including tape adhered to the surface of said balloon.

11. A manikin as claimed in claim 10, said means for preventing explosion of said balloon being located such that, in proper needle centesis for treatment of pneumothorax, the needle will engage said means for preventing explosion of said balloon.

12. A manikin as claimed in claim 10, said flexible body covering defining an opening therein, and means for selectively closing said opening, the arrangement being such that said balloon means and said filler can be placed into said thoracic cavity and said opening can be closed to retain said balloon means and said filler.

* * * * *